US012536540B2

United States Patent
Klezin et al.

(10) Patent No.: US 12,536,540 B2
(45) Date of Patent: Jan. 27, 2026

(54) METHODS AND SYSTEM FOR WIRELESS TRANSACTIONS

(71) Applicant: NXP B.V., Eindhoven (NL)

(72) Inventors: Gregor Klezin, Lasko (SI); Sunil Dilipkumar Jogi, Bangalore (IN)

(73) Assignee: NXP B.V., Eindhoven (NL)

( * ) Notice: Subject to any disclaimer, the term of this patent is extended or adjusted under 35 U.S.C. 154(b) by 879 days.

(21) Appl. No.: 17/728,862

(22) Filed: Apr. 25, 2022

(65) Prior Publication Data

US 2023/0342782 A1   Oct. 26, 2023

(51) Int. Cl.
*G06Q 20/40* (2012.01)
*H04L 12/18* (2006.01)

(52) U.S. Cl.
CPC ... *G06Q 20/40155* (2020.05); *H04L 12/1845* (2013.01)

(58) Field of Classification Search
CPC ........... G06Q 20/40155; G06Q 20/204; G06Q 20/327; G06Q 20/401; G06Q 20/405; H04L 12/1845; G07G 1/14; G07G 1/0036; H04W 4/023; H04W 4/35; H04W 4/80

See application file for complete search history.

(56) References Cited

U.S. PATENT DOCUMENTS

| | | | |
|---|---|---|---|
| 8,838,481 B2 | 9/2014 | Moshfeghi | |
| 2003/0144793 A1* | 7/2003 | Melaku | G06Q 30/02 |
| | | | 701/434 |
| 2007/0045019 A1* | 3/2007 | Carter | B60T 7/16 |
| | | | 180/271 |
| 2012/0316963 A1 | 12/2012 | Moshfeghi | |
| 2017/0309290 A1* | 10/2017 | Jones | G10L 21/0208 |
| 2018/0349653 A1 | 12/2018 | Al-Kadi et al. | |
| 2019/0124487 A1* | 4/2019 | Jones | G06Q 10/087 |
| 2020/0258070 A1* | 8/2020 | Fujisawa | G06Q 20/208 |
| 2021/0027360 A1* | 1/2021 | Shmueli | G06F 1/163 |

(Continued)

FOREIGN PATENT DOCUMENTS

| | | |
|---|---|---|
| CN | 110363529 A | 10/2019 |
| KR | 20110107782 A | 5/2013 |

(Continued)

OTHER PUBLICATIONS

Indoor Positioning (Year: 2019).*

*Primary Examiner* — Nizar N Sivji

(57) ABSTRACT

Embodiments of methods and a system for wireless transactions are disclosed. In an embodiment, the method includes performing multicast Ultra-Wideband (UWB) ranging, where the multicast UWB ranging includes calculating a distance between a first device and a second device, and calculating an angle of arrival (AoA) of the second device, determining, using the distance and the AoA, whether the second device is located in a transaction zone that is defined by the first device, exchanging wireless transaction information between the first device and the second device when the second device is located in the transaction zone, where the wireless transaction information includes a transaction request, and initiating a transaction upon the second device accepting the transaction request and upon confirming, using the distance and the AoA, that the second device is still located in the transaction zone, and the second device is oriented towards the first device.

20 Claims, 9 Drawing Sheets

(56) References Cited

U.S. PATENT DOCUMENTS

| | | | |
|---|---|---|---|
| 2021/0090057 A1* | 3/2021 | Takeno | G08B 13/19608 |
| 2021/0122335 A1* | 4/2021 | Foster | G06Q 20/3224 |
| 2021/0174338 A1* | 6/2021 | Isaacson | G06Q 40/02 |
| 2021/0192531 A1* | 6/2021 | Pearson | G07G 1/14 |
| 2021/0312424 A1* | 10/2021 | Lee | G06Q 20/3278 |
| 2023/0025845 A1* | 1/2023 | Khoury | H04W 4/023 |
| 2023/0099551 A1* | 3/2023 | Gupta | H04W 64/003 |
| | | | 701/36 |
| 2023/0325807 A1* | 10/2023 | Suzuki | H04W 4/42 |
| 2024/0202700 A1* | 6/2024 | Koo | G06Q 20/409 |

FOREIGN PATENT DOCUMENTS

| | | | | |
|---|---|---|---|---|
| WO | WO-2016114987 A1 * | 7/2016 | | B62B 5/0096 |
| WO | 2021104010 A1 | 6/2021 | | |
| WO | WO-2024101468 A1 * | 5/2024 | | |

* cited by examiner (FAILURE)

(SUCCESS)

METHODS AND SYSTEM FOR WIRELESS TRANSACTIONS

BACKGROUND

In wireless transactions (e.g., wireless financial transactions), devices can transmit and receive information related to a payment through wireless mediums to complete contactless payments. For example, a payer device (e.g., a mobile phone or a smartwatch) may exchange payment information with a payee device (e.g., a point of sale (POS) system) to complete a wireless financial transaction. In order to successfully exchange payment information and complete a wireless financial transaction, some wireless technologies require the payer device to be within close proximity of the payee device. Such transactions may be inefficient because of errors that occur as a result of improper placement of the payer device, insufficient reading time, or other communication-related difficulties.

SUMMARY

Embodiments of methods and a system for wireless transactions are disclosed. In an embodiment, the method includes performing multicast Ultra-Wideband (UWB) ranging, where the multicast UWB ranging includes calculating a distance between a first device and a second device, and calculating an angle of arrival (AoA) of the second device, determining, using the distance and the AoA, whether the second device is located in a transaction zone that is defined by the first device, exchanging wireless transaction information between the first device and the second device when the second device is located in the transaction zone, where the wireless transaction information includes a transaction request, and initiating a transaction upon the second device accepting the transaction request and upon confirming, using the distance and the AoA, that the second device is still located in the transaction zone, and the second device is oriented towards the first device.

In an embodiment, confirming the distance and the AoA includes determining whether the distance is within a predefined distance range, and the AoA is within a predefined AoA range.

In an embodiment, at least one of the second device and the first device calculates the distance, and the first device calculates the AoA.

In an embodiment, the multicast UWB ranging is performed by the first device and devices included in a multicast responders list, and where the devices included in the multicast responders list include the second device and other devices that exchanged first device information and second device information with the first device prior to the multicast UWB ranging.

In an embodiment, exchanging the first device information and the second device information includes transmitting, by the first device to the second device, the first device information, receiving, by the second device from the first device, the first device information, transmitting, by the second device to the first device, the second device information in response to receiving the first device information, receiving, by the first device from the second device, the second device information, and creating, by the first device, the multicast responders list that includes the second device in response to receiving the second device information.

In an embodiment, the transaction zone defined by the first device is within a predefined calculated range of a UWB radio of the first device.

In an embodiment, determining whether the second device is located in the transaction zone includes the second device being included in a multicast responders list, and removing the second device from the multicast responders list when the second device is not located in the transaction zone.

In an embodiment, exchanging the wireless transaction information includes transmitting, by the first device to the second device, the transaction request, where the second device is included in a reduced multicast responders list, receiving, by the second device from the first device, the transaction request, and determining, by the second device, whether to accept the transaction request.

In an embodiment, determining whether to accept the transaction request involves a timeout of the transaction request when the second device does not act upon the transaction request within a defined amount of time.

In an embodiment, determining whether to accept the transaction request involves the transaction request being discarded from other devices when the second device accepts the transaction request.

In an embodiment, exchanging the wireless transaction information includes authenticating ownership of a transaction medium when the second device accepts the transaction request, and where authenticating ownership of the transaction medium includes an application prompting authentication to a user of the second device, where the user performs the authentication, and receiving, by the second device from the first device, transaction information in response to the user completing the authentication.

In an embodiment, the wireless transaction information includes partial information for privacy of the wireless transaction information.

In an embodiment, the second device and the first device pair before the transaction is initiated.

In an embodiment, the second device and the first device receive a confirmation notification once the second device and the first device are paired.

In an embodiment, initiating the transaction involves triggering, by a user of the second device, initiation of the transaction.

In an embodiment, the user of the second device triggers initiation of the transaction by swiping a transaction medium towards the first device.

In an embodiment, the transaction medium is shown by the second device via at least one of a graphical user interface (GUI) and a user interface (UI).

In an embodiment, the second device provides a visual confirmation that the second device is oriented towards the first device before the transaction is initiated.

A system for wireless transactions is also disclosed. In an embodiment, the system includes a first device configured to perform multicast UWB ranging, where the multicast UWB ranging includes calculating a distance between the first device and a second device, and calculating an AoA of the second device, determine, using the distance and the AoA, whether the second device is located in a transaction zone defined by the first device, and exchange wireless transaction information with the second device when the second device is located in the transaction zone, where the wireless transaction information includes a transaction request, and the second device configured to initiate a transaction upon accepting the transaction request and upon confirming, using the distance and the AoA, that the second device is still located in the transaction zone, and the second device is oriented towards the first device.

Another method for wireless transactions is also disclosed. In an embodiment, the method includes performing multicast UWB ranging, where the multicast UWB ranging includes calculating a distance between a payee device and a payer device, and calculating an AoA of the payer device, determining, using the distance and the AoA, whether the payer device is located in a payment zone that is defined by the payee device, exchanging payment transaction information between the payee device and the payer device when the payer device is located in the payment zone, where the payment transaction information includes a payment request, and initiating a payment upon the payer device accepting the payment request and upon confirming, using the distance and the AoA, that the payer device is still located in the payment zone, and the payer device is oriented towards the payee device.

Other aspects in accordance with the invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1:
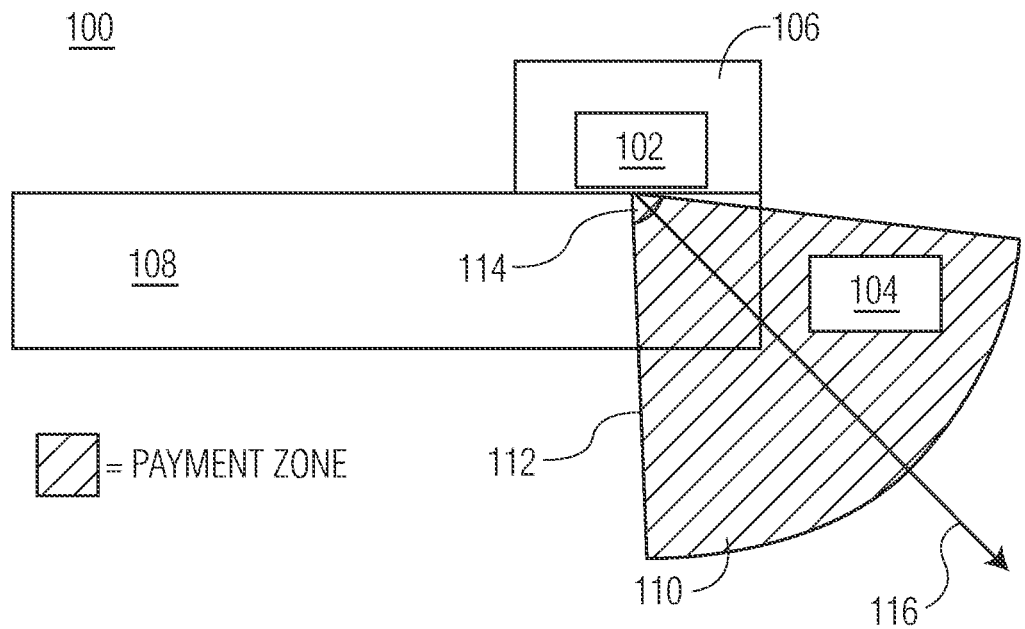
FIG. 1 depicts an example of an environment that includes a wireless transaction system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Transaction systems often use Near-field communication (NFC) or contact interfaces for payments. For example, current point of sale (POS) transactions often involve a payee device (e.g., a POS system) accepting payments in the form of a physical payment (e.g., a credit card) or an NFC-based contactless payment (e.g., an e-wallet). To perform a transaction via an NFC-based contactless payment, a payer device (e.g., a card, a mobile device, a smartwatch, or other contactless-enabled payment device) may be positioned within close proximity of the payee device. However, such transactions require the payer device to be within, for example, 20 centimeters (cm), and often experience errors as a result of improper placement of the payer device (e.g., the payer device is too far from, or not properly aligned with the payee device), insufficient reading time, or other communication-related difficulties.

As an alternative to NFC-based contactless payment technologies, Ultra-Wideband (UWB) communications may be used to conduct wireless transactions (e.g., wireless financial transactions). As described herein, "UWB communications" may refer to a radio technology that can use a very low energy level for short-range (e.g., within 50 meters (m)), high-bandwidth communication over a large portion of the radio spectrum. In addition, UWB may refer to a technology for transmitting information spread over a large bandwidth (e.g., approximately 500 MHz or greater than 500 MHz). In some embodiments, UWB may involve a wireless transmission for which an emitted signal bandwidth exceeds the lesser of 500 MHz or 20% of the arithmetic center frequency. In some embodiments, UWB communications may involve the transmission of information by generating electronic energy at a radio frequency at specific time intervals and occupying a large bandwidth, thus enabling pulse-position or time modulation.

In conventional NFC-based contactless payments, various steps for initiating a payment between a payee device and a payer device are straightforward due to the requirement that the payer device be in close proximity (e.g., within 20 cm) of the payee device. Wireless financial transactions that use UWB, however, are more complex due to an increased distance between the devices. As such, protocols for payment intent, consumer device cardholder verification method (CDCVM), and payment transactions between the payee device and the payer device may need to be further defined for wireless transactions using UWB communications.

In accordance with an embodiment of the invention, a technique for wireless transactions may involve performing multicast UWB ranging, wherein the multicast UWB ranging includes calculating a distance between a first device and a second device, and calculating an angle of arrival (AoA) of the second device, determining, using the distance and the AoA, whether the second device is located in a transaction zone that is defined by the first device, exchanging wireless transaction information between the first device and the second device when the second device is located in the transaction zone, wherein the wireless transaction information includes a transaction request, and initiating a transaction upon the second device accepting the transaction request and upon confirming, using the distance and the AoA, that the second device is still located in the transaction zone, and the second device is oriented towards the first device. Using the distance and the AoA, devices that perform wireless transactions are able to accurately determine the positions of such devices and increase the distance at which wireless transactions (e.g., contactless payments) may be performed. Therefore, UWB technology can be utilized to improve the efficiency of wireless transactions.

In embodiments described herein, a "wireless transaction" may be, for example, a wireless financial transaction or a wireless non-financial transaction that involves two or more devices exchanging information to be used for further transaction-related functions. Examples of wireless financial transactions may include initiating a payment, initiating a refund, transferring payment account details, loyalty & couponing, etc. Examples of wireless non-financial transactions may include sharing private data, accessing an electronic device, sharing information between multiple UWB-based devices, targeted advertisement, etc. Although embodiments described herein reference examples of wireless financial transactions, such embodiments are not limited to such examples.

In embodiments described herein, a "payee device" (sometimes referred to as a "first device") may be a POS system (e.g., a register, a vending machine, a desktop, a laptop, a mobile phone, a wearable, a smartwatch, a tablet, etc.). As an example, payee devices are configured to transmit and receive payment information for wireless transactions (e.g., wireless financial transactions), such that payee devices may accept payments from other devices (e.g., payer devices). In some embodiments, payee devices may establish communication with payer devices using a UWB wireless protocol and optionally, using a non-UWB wireless protocol. Examples of the non-UWB wireless protocol may include, but are not limited to, Long Term Evolution (LTE), Bluetooth Low Energy (BLE), Wi-Fi, cellular, etc. In some embodiments, payee devices are equipped with UWB components needed to communicate via the UWB wireless protocol, and are equipped with non-UWB components needed to communicate via the non-UWB wireless protocol.

In embodiments described herein, a "payer device" (sometimes referred to as a "second device") may be a personal communications device (e.g., a mobile phone, a wearable, a smartwatch, a tablet, a tag, etc.). As an example, payer devices are configured to transmit and receive payment information for wireless financial transactions, such that the payer devices may initiate payments to payee devices using a payment medium (e.g., a payment card, a payment account, etc.). In some embodiments, payer devices may establish communication with payee devices using a UWB wireless protocol and optionally, using a non-UWB wireless protocol. In some embodiments, payer devices are equipped with UWB components needed to communicate via the UWB wireless protocol, and are equipped with non-UWB components needed to communicate via the non-UWB wireless protocol.

In embodiments described herein, a "wireless transaction system" may include a payee device and a payer device. As an example, the wireless transaction system may be an infrastructure for wireless transactions, such that the payee device and the payer device may communicate and exchange payment information to initiate a payment. A wireless transaction system performing multicast UWB (radio frequency (RF)) ranging may employ a Time-of-Flight principle to determine UWB-based measurements. The UWB-based measurements may include, for example, a distance between a payee device and a payer device, and an AoA of the payer device.

In some embodiments, a transceiver's transmitter (associated with the payee device or the payer device) sends out electromagnetic energy in a waveform, commonly a chirp or a pulse, which is either reflected by an object or retransmitted in a response by a second transceiver (associated with the payer device or the payee device). Based on the angle and the amount of time it takes for the reflection or retransmission of the electromagnetic energy (e.g., chirp or pulse) to reach the originating transceiver's receiver, the distance between the devices and the AoA of the receiver can be calculated. The calculated distance and the calculated AoA may then be used to determine a location, such that the location may be used to perform further wireless transaction-related functions. Examples of a wireless transaction system that includes a payee device and a payer device are described in further detail with reference to FIGS. 1-2.

FIG. 1 depicts an example of an environment that includes a wireless transaction system 100. In the embodiment depicted in FIG. 1, the wireless transaction system 100 includes a payee device 102 that wirelessly communicates with a payer device 104. The wireless transaction system can be used in various applications such as, for example, consumer applications. The wireless transaction system may be compatible with an Institute of Electrical and Electronics Engineers (IEEE) 802.15.4 protocol. For example, the wireless transaction system may be compatible with the IEEE 802.15.4z protocol. Although the wireless transaction system is shown in FIG. 1 with certain components and described with certain functionality herein, other embodiments of the wireless transaction system may include fewer or more components to implement the same, less, or more functionality. In another example, although the wireless transaction system is shown in FIG. 1 as being arranged in a certain topology, the network topology of the wireless transaction system is not limited to the topology shown in FIG. 1.

The payee device 102 is a UWB enabled device that includes a UWB radio and optionally, a non-UWB radio. The UWB radio and/or the non-UWB radio may be implemented in hardware (e.g., circuits), software, firmware, or a combination thereof. Additionally, the UWB radio and/or the non-UWB radio of the payee device 102 may be fully or partially implemented as an integrated circuit (IC) device. In some embodiments, the UWB radio may be compatible with at least one UWB wireless protocol (e.g., at least one IEEE 802.15.4 protocol). For example, the UWB radio may be compatible with the IEEE 802.15.4z protocol. In some embodiments, the UWB radio is a wireless UWB radio that wirelessly connects to the payer device 104, for example, through one or more UWB wireless protocols, such as the IEEE 802.15.4 protocol.

In some embodiments, the UWB radio includes at least one antenna, at least one transceiver operably connected to the at least one antenna, and at least one controller operably connected to the corresponding transceiver. In some embodiments, the at least one transceiver includes a physical layer (PHY) device. The at least one controller may be configured to control the at least one transceiver to process received packets (e.g., blink packets) through the at least one antenna. In some embodiments, the at least one controller is implemented within a processor, such as a microcontroller (MCU), a host processor, a host, a digital signal processor (DSP), or a central processing unit (CPU), which can be integrated in a corresponding transceiver.

The payer device 104 is associated with (e.g., wirelessly connected to) the payee device 102 and may communicate with the payee device via UWB communications and optionally, via non-UWB communications. As an example, the payer device 104 includes a UWB radio and optionally, a non-UWB radio that may be implemented and have similar features as the UWB radio and the non-UWB radio of the payee device 102. In such an embodiment, the payer device 104 can exchange information with the payee device 102 as part of a wireless financial transaction.

As an example, the payee device 102 may be implemented at a checkout counter. In such an example, the payee device 102 is located in a cashier's zone 106 that is adjacent to a conveyor belt 108. The payee device 102 may define a payment zone 110, such that the payment zone has a distance 112, a magnitude of an angle 114, and a direction 116. As described herein, a "payment zone" may also be referred to as a "transaction zone". Although the payment zone 110 is shown as having a certain shape in FIG. 1, the payment zone may be any shape and/or any size within range of one or more UWB radios.

In an embodiment, the payment zone 110 is a logical zone where payments from the payer device 104 can be initiated. The payment zone 110 is a logical zone that can be established by one or more UWB radios. For example, the payment zone may be within a predefined calculated range (e.g., a quarter circle with a 2 m radius) of a UWB radio of the payee device 102, more than one UWB radio of the payee device, a UWB radio of the payee device and a UWB radio of the payer device 104, or a combination thereof.

In addition, because the payment zone 110 is a logical zone, the payment zone may be changed depending on various factors including, for example, time of day, day of the week, customer density information, environmental factors, or many other conditions related to the payment operation. In an embodiment, the parameters of the payment zone may be selected to provide improved performance given certain operations conditions. In such an embodiment, the payee device may select specific payment zone parameters from a predefined set of payment zone parameters. For example, the payee device may have various predefined payment zones in which each payment zone has a predefined set of distance, magnitude of angle, and directions parameters. Examples of payment zone parameters are provided in Table 1.

TABLE 1

| Zone Name | Distance | Magnitude of Angle | Direction of Payment Zone |
|---|---|---|---|
| A | 1 m | 15 degrees | 45 degrees |
| B | 2 m | 45 degrees | 135 degrees |
| C | 3 m | 75 degrees | 225 degrees |

As shown by Table 1, a payment zone (e.g., payment zone 110) may be defined by a distance, a magnitude of an angle, and a direction. In an embodiment, the distance represents the length of the payment zone, the magnitude of the angle represents the width of the payment zone, and the direction represents orientation of the payment zone in relation to the payee device 102. For example, the direction of payment is characterized as an angle of rotation from a central point (e.g., from 0 degrees to 360 degrees). In an embodiment, the distance, the magnitude of the angle, and/or the direction can change for specific uses based on the hour of the day, the number of payer devices present in the environment, the type of wireless financial transaction being performed, etc. As an example, if the payment zone is implemented by a wireless transaction system in a store, then the payment zone may be larger when the store is not busy (e.g., when there are less payer devices frequenting the payment zone), or may be smaller when the store is busy (e.g., when there are more payer devices frequenting the payment zone).

Figure 2:
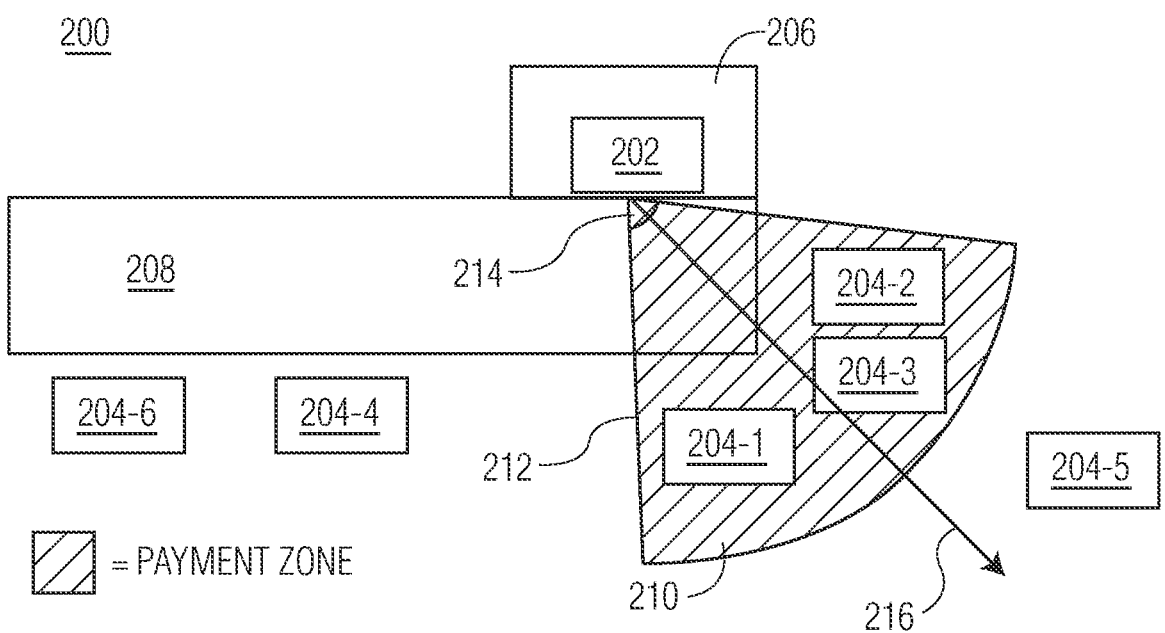
FIG. 2 depicts an example of an environment that includes a wireless transaction system with multiple payer devices.

FIG. 2 depicts an example of an environment that includes a wireless transaction system 200 with multiple payer devices. In the embodiment of FIG. 2, the wireless transaction system 200 includes a payee device 202 that is located in a cashier's zone 206 that is adjacent to a conveyor belt 208, and a payment zone 210 with a distance 212, a magnitude of an angle 214, and a direction 216 as described with reference to FIG. 1.

In contrast to FIG. 1, the wireless transaction system 200 of FIG. 2 includes six payer devices, implemented as Payer1 204-1, Payer2 204-2, Payer3 204-3, Payer4 204-4, Payer5 204-5, and Payer6 204-6. In an embodiment, the payer devices may exchange payee information and payer information with the payee device 202, be included in a multicast responders list, and perform multicast UWB ranging with the payee device. In such an embodiment, because Payer1 204-1, Payer2 204-2, and Payer3 204-3 are located in the payment zone 210, Payer1, Payer2, and Payer3 may be included in a reduced multicast responders list and may exchange payment information with the payee device 202, such that one of the payer devices (e.g., Payer1, Payer2, or Payer3) may initiate a payment to the payee device. However, because Payer4 204-4, Payer5 204-5, and Payer6 204-6 are not located in the payment zone 210, Payer4, Payer5, and Payer6 may be excluded from the reduced multicast responders list and may not initiate the payment to the payee device 202.

Although the wireless transaction system 200 of FIG. 2 is shown as including six payer devices, three located in the payment zone and three not located in the payment zone, there may be any number of devices located in the payment zone and/or not located in the payment zone. Additionally, although the devices (e.g., payee device and payer devices)

are positioned in certain locations, the locations of the devices are not limited to the locations shown in FIG. 2. Payer devices may also move around as a user of a payer device moves around, e.g., as the user moves around a store, checkout counter, or other payment-related location.

In an embodiment, for a wireless transaction system to initiate a payment, a payee device and a payer device need to communicate to determine whether the payer device can initiate the payment, exchange payment transaction information, and pair with the payee device. An example of communications between a payee device and a payer device is described in further detail with reference to FIG. 3.

Figure 3:
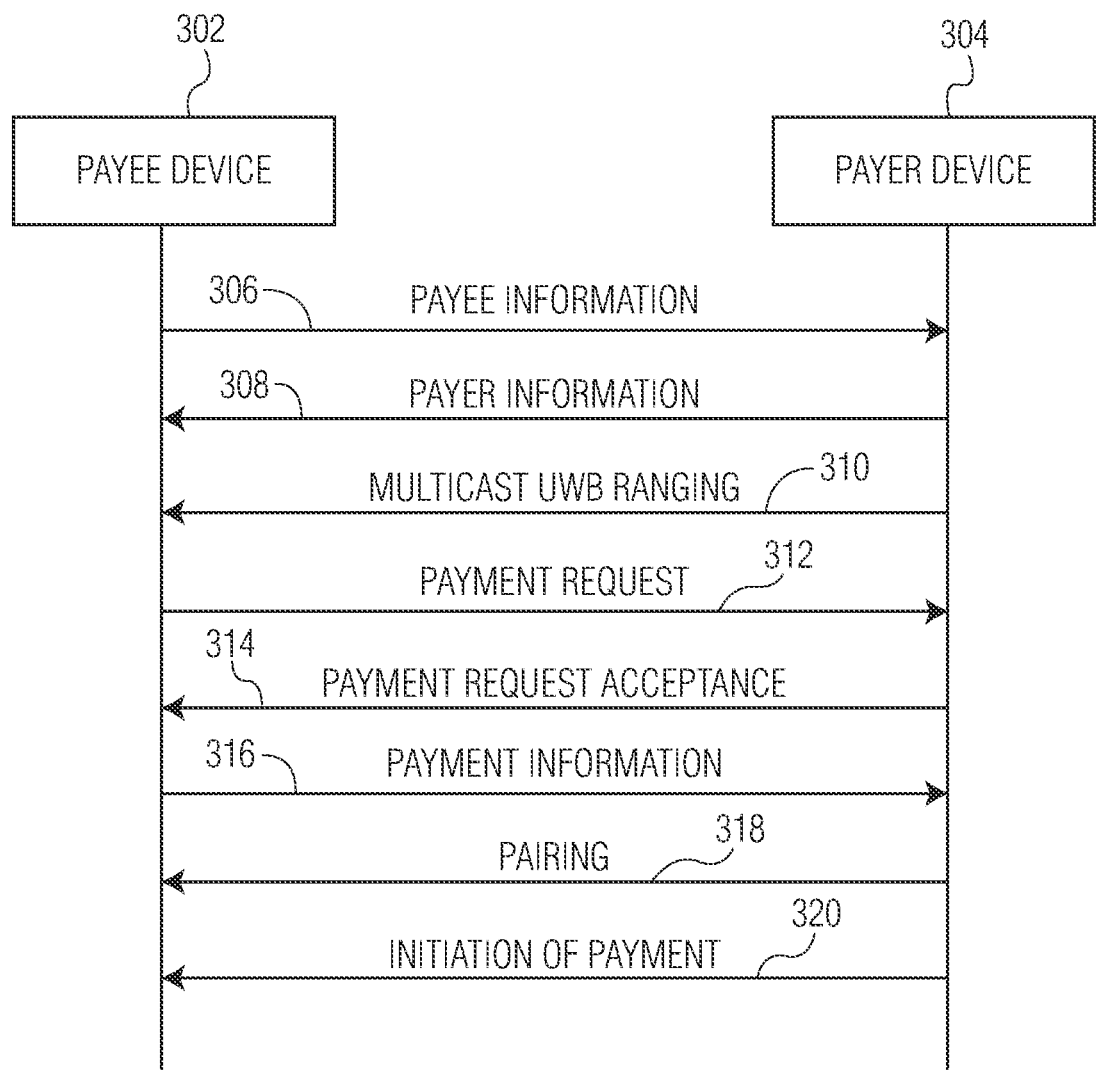
FIG. 3 is an example of communications between a payee device and a payer device.

FIG. 3 is an example of communications between a payee device 302 and a payer device 304. The communications shown in FIG. 3 are part of a wireless financial transaction. In the embodiment of FIG. 3, the payee device 302 and the payer device 304 communicate via a UWB wireless protocol and optionally, via a non-UWB wireless protocol.

The wireless financial transaction begins when the payee device 302 transmits payee information 306 (shown by "payee information") using an in-band UWB medium or an out-of-band medium. As shown, the payee information is transmitted to the payer device 304, however, the payee information may also be transmitted to other device(s), e.g., other payer device(s) (not shown), that are within range of the payee device 302. The payee information includes information related to a corresponding payee device such as, for example, service information identification, payee identification information, and/or nonce. In an embodiment, the payee device may reduce output power to limit its radio range when transmitting the payee information.

In response to receiving the payee information, the payer device 304 transmits payer information 308 (shown by "payer information") to the payee device 302 using the in-band UWB medium or the out-of-band medium. Additionally, the other payer device(s) (not shown) may transmit payer information to the payee device 302. The payer information includes information related to a corresponding payer device such as, for example, service identification information, nonce, a UWB Media Access Control (MAC) address, or a UWB device role.

After the payee device 302 receives the payer information from the payer device 304 (and the other payer device(s)), the payee device creates a multicast responders list based on the payer information received from the payer device(s). In an embodiment, the multicast responders list includes the payer device 304 and the other payer device(s) that exchanged the payee information and the payer information with the payee device 302. As described with reference to FIG. 2, the multicast responders list would include Payer1 204-1, Payer2 204-2, Payer3 204-3, Payer4 204-4, Payer5 204-5, and Payer6 204-6.

After creating the multicast responders list, the payee device 302 then performs multicast UWB ranging 310 (shown by "multicast UWB ranging") with devices included in the multicast responders list (e.g., the payer device 304 and the other payer device(s) (not shown)). In an embodiment, the payee device 302 initiates the multicast UWB ranging with the devices included in the multicast responders list, such that the devices included in the multicast responders list include the payer device 304 and the other payer device(s) that exchanged the payee information and the payer information with the payee device 302 prior to the multicast UWB ranging. After the multicast UWB ranging has been initiated by the payee device 302, the payer device 304 and the other payer device(s) then begin to participate in the multicast UWB ranging with the payee device 302.

In an embodiment, performing the multicast UWB ranging includes calculating a distance between the payee device 302 and the payer device 304, and calculating an AoA of the payer device 304. Additionally, performing the multicast UWB ranging may include calculating the distance between the payee device and other payer device(s) (not shown), and calculating the AoA of the other payer device(s). Then, using the distance and the AoA, it can be determined whether the payer device(s) are located in a payment zone (e.g., the payment zone 210 shown in FIG. 2) defined by the payee device. As an example, the payee device (and/or the payer device(s)) calculates the distance between the payee device and the payer device(s), and the payer device(s) calculate the AoA. In such an example, the payee device and optionally, the payer device(s) determine, using the distance and the AoA, whether the payer device(s) are located in the payment zone.

In an embodiment, determining whether the payer device(s) are located in the payment zone defined by the payee device includes the payer device(s) being included in the multicast responders list, and removing the payer device(s) from the multicast responders list when the payer device(s) are not located in the payment zone defined by the payee device. For example, if the payer device is not within a predefined distance range and a predefined AoA range that defines the payment zone, then the payer device would be removed from the multicast responders list. With reference to FIG. 2, because Payer4 204-4, Payer5 204-5, and Payer6 204-6 are not located in the payment zone 210, Payer4, Payer5, and Payer6 would be removed from the multicast responders list.

In addition, determining whether the payer device(s) are located in the payment zone defined by the payee device includes the payer device(s) being included in the multicast responders list, and keeping the payer device(s) on the multicast responders list when the payer device(s) are located in the payment zone defined by the payee device. For example, if the payer device is within the predefined distance range and the predefined AoA range that defines the payment zone, then the payer device would be kept on the multicast responders list. With reference to FIG. 2, because Payer1 204-1, Payer2 204-2, and Payer3 204-3 are located in the payment zone 210, Payer1, Payer2, and Payer3 would be kept on the multicast responders list. As an example, the step of determining whether the payer device(s) are located in the payment zone may be performed at time intervals of, e.g., one millisecond, one second, two seconds, etc., until a payment is initiated by a payer device.

After the payee device has determined whether the payer device(s) are located in the payment zone, the remaining devices included in the multicast responders list would then be included in a reduced multicast responders list. As an example, the reduced multicast responders list includes the payer device 304 and the other payer device(s) located in the payment zone defined by the payee device. With reference to FIG. 2, Payer1 204-1, Payer2 204-2, and Payer3 204-3 would be included in a reduced multicast responders list.

Then, using the reduced multicast responders list, payment transaction information is exchanged between the payee device 302 and the payer device(s). In an embodiment, the payee device 302 exchanges payment transaction information with the payer device 304 when the payer device is located in the payment zone defined by the payee device. In such an embodiment, exchanging payment transaction information includes the payee device 302 initiating the exchange of the payment transaction information by transmitting a payment request 312 (shown by "payment request") to the payer device 304 using an in-band UWB medium or an out-of-band medium. The payment request may be visualized to a user of the payer device(s) via a notification (e.g., a pop-up notification, audio notification, and/or vibrational notification). In an embodiment, the payment transaction information includes a payment request, payment request acceptance, and partial information (e.g., identification of the payee device) for privacy of the payment transaction information. Although not shown, the payment request may also be transmitted to the other payer device(s) located in the payment zone defined by the payee device.

After the payer device(s) receive the payment request, the payer device(s) may accept or reject the payment request. In an embodiment, if the payment request is received by one payer device (e.g., payer device 304), and the payer device does not act upon the payment request within a defined amount of time, e.g., then a timeout of the payment request occurs, and a payment is not initiated. In another embodiment, if the payment request is received by one payer device (e.g., payer device 304), and the payer device accepts the payment request, e.g., then the payer device transmits a payment request acceptance 314 (shown by "payment request acceptance") to the payee device 302. As an example, the payment request may only be accepted by one payer device.

With reference to FIG. 2, in yet another embodiment, if the payment request is received by multiple payer devices (e.g., Payer1 204-1, Payer2 204-2, and Payer3 204-3 as shown in FIG. 2) and one payer device (e.g., Payer1 204-1) accepts the payment request, then Payer1 transmits a payment request acceptance to the payee device and the payment request is discarded from the other payer devices (e.g., Payer2 204-2 and Payer3 204-3).

In an embodiment, exchanging the payment transaction information further includes authenticating ownership of a payment medium (e.g., a payment card, a payment account, etc.) when the payer device 304 accepts the payment request. In an embodiment, authenticating ownership of the payment medium includes an application prompting authentication (e.g., a pin, a face identification, a fingerprint, etc.) to a user of the payer device 304, the user performing the authentication, and receiving, from the payee device 302, payment information 316 (shown by "payment information") in response to the user completing the authentication. The payment information may include information related to the payment such as, for example, payment amount, invoice details, identification of the payee device, recipient of the payment, etc. Once the payer device 304 has accepted the payment request, authenticated ownership of the payment medium, and finished exchanging the payment transaction information with the payee device 302, the payer device 304 and the payee device 302 may proceed to pair.

In an embodiment, the payee device 302 and the payer device 304 may begin pairing 318 (shown by "pairing") when the payer device accepts the payment request. The payer device 304 and the payee device 302 may then receive a confirmation notification that the payer device and the payee device are paired. As an example, the confirmation notification may be a visual confirmation notification, a sound-based confirmation notification, or any other confirmation notification that identifies that the payer device and the payee device are paired for the payment and that no other rogue device is trying to act as the payer device or the payee device.

In an embodiment, pairing includes confirming, using the distance and the AoA, that the payer device is still located in the payment zone, and that the payer device is oriented (e.g., pointed, directed, facing, etc.) towards the payee device. In such an embodiment, confirming the distance and the AoA includes using known techniques to determine whether the distance is within a predefined distance range (e.g., within 2 m) and whether the AoA is within a predefined AoA range (e.g., an AoA in range of ±5 degrees) for the payer device. As an example, the distance is calculated by the payer device and optionally, the payee device, and the AoA is calculated by the payee device.

When the distance is within the predefined distance range and the AoA is within the predefined AoA range, the distance and the AoA are confirmed. In such an example, "confirmed" implies that the distance and the AoA are within the predefined distance range and the predefined AoA range, respectively. As an example, the payer device may provide a visual confirmation upon the distance and the AoA being confirmed. In some embodiments, the payer device also provides another visual confirmation that the payer device is oriented towards the payee device before the payment is initiated. The visual confirmation(s) may be shown intuitively, e.g., by a certain visualization (card gets a colored border, card changes colors, etc.). In some embodiments, the visual confirmation(s) may also be a sound-based confirmation, a vibrational confirmation, or any other type of confirmation.

The wireless financial transaction may then include initiating a payment upon the payer device 304 accepting the payment request and upon confirming, using the distance and the AoA, that the payer device is still located in the payment zone and is oriented towards the payee device 302. In an embodiment, initiating the payment includes triggering, by the user of the payer device 304, initiation of the payment. As an example, the user may trigger initiation of the payment by swiping a payment medium (e.g., a payment card visual or payment information visual) towards the payee device 302. Additionally, in such an example, the payment medium may be shown by the payer device to the user via a graphical user interface (GUI) or a user interface (UI) of the payer device 304. Once the user has triggered initiation of the payment, the payee device 302 may receive an indication that the payer device 304 initiated the payment 320 (shown by "initiation of payment").

Although not shown by FIG. 3, after the payment has been initiated, a payment transaction may then occur using a UWB medium, a non-UWB medium, or a cloud-based server. In an embodiment, the payment transaction involves the payer device 304 transmitting the payment to the payee device 302, and the payee device receiving the payment. Once the payee device has received the payment, the wireless transaction may be complete.

Although FIG. 3 illustrates communications with reference to a wireless financial transaction, similar communications may also be used for wireless non-financial transactions and other wireless transactions. Such communications may involve a first device and a second device exchanging first device information and second device information, the first device transmitting a transaction request, and the second device accepting the transaction request. After the transaction request has been accepted, the first device may transmit transaction information, the first and second devices may pair, and a transaction may be initiated.

In an embodiment, during communications between a payee device and a payer device, the payer device and the payee device may each perform operations corresponding to a wireless transaction (e.g., a wireless financial transaction).

An example of payee operations during a wireless transaction and an example of payer operations during a wireless transaction are described in further detail with reference to FIG. 4 and FIG. 5, respectively.

Figure 4:
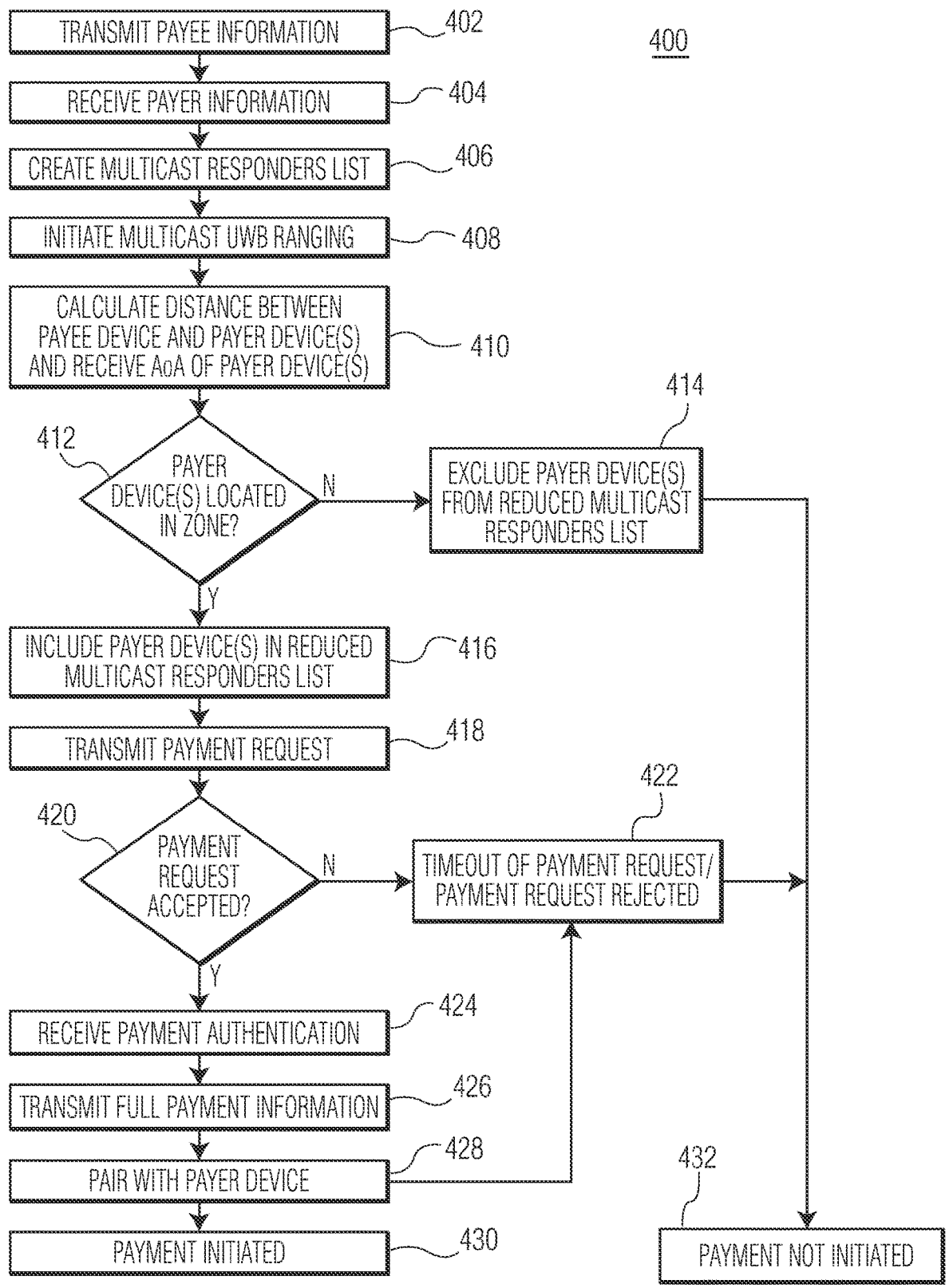
FIG. 4 is a process flow diagram of payee operations during a wireless transaction.

FIG. 4 is a process flow diagram of payee operations 400 during a wireless transaction. In an embodiment, the payee operations 400 may be implemented by a payee device (not shown) when communicating with payer devices (not shown) as described with reference to FIG. 3.

At block 402, the payee device transmits payee information to the payer device(s) to initiate a wireless transaction. The payee device then receives payer information from the payer device(s) at block 404. At block 406, the payee device creates a multicast responders list in response to the payer information received from the payer device(s). At block 408, the payee device initiates multicast UWB ranging with the payer device(s) included in the multicast responders list, and performs the multicast UWB ranging with the payer device(s). At block 410, the payee device then calculates a distance between the payee device and the payer device(s), and receives an AoA of the payer device(s).

At block 412, the payee device determines whether the payer device(s) are located in a payment zone defined by the payee device. If the payer device(s) are not located in the payment zone (shown by "N"), then at block 414, the payee device excludes the payer devices(s) from a reduced multicast responders list. At block 432, the payment is not initiated because the payee device does not receive an indication of an initiated payment from the payer device(s) excluded from the reduced multicast responders list. If the payer device(s) are located in the payment zone (shown by "Y"), then at block 416, the payee device includes the payer devices(s) in the reduced multicast responders list. At block 418, the payee device transmits a payment request to the payer device(s) included in the reduced multicast responders list.

At block 420, the payee device determines whether the payer device(s) accepted the payment request. If the payee device does not receive a payment request acceptance (shown by "N"), then at block 422, either a timeout of the payment request occurs, or the payer device(s) reject the payment request. At block 432, the payment is not initiated because the payee device does not receive an indication of an initiated payment from the payer device(s) that rejected the payment request, or from the payer device(s) where the timeout of the payment request occurred. If the payee device receives a payment request acceptance (shown by "Y"), then at block 424, the payee device receives a payment authentication from the payer device that accepted the payment request.

At block 426, the payee device transmits full payment information to the payer device that transmitted the payment authentication to the payee device. The payee device then pairs with the payer device at block 428. In one embodiment, after the payee device pairs with the payer device, a timeout of the payment request may occur at block 422, such that a payment is not initiated at block 432. In another embodiment, after the payee device pairs with the payer device, the payment is initiated at block 430 because the payee device receives an indication of an initiated payment from the payer device.

Although FIG. 4 depicts payee device operations with reference to a wireless financial transaction, similar operations may also be used for wireless non-financial transactions and other wireless transactions. Such operations may involve a first device performing similar steps during the wireless transaction being conducted. In an embodiment, the first device communicates with a second device and operates according to information exchanged during the wireless transaction.

Figure 5:
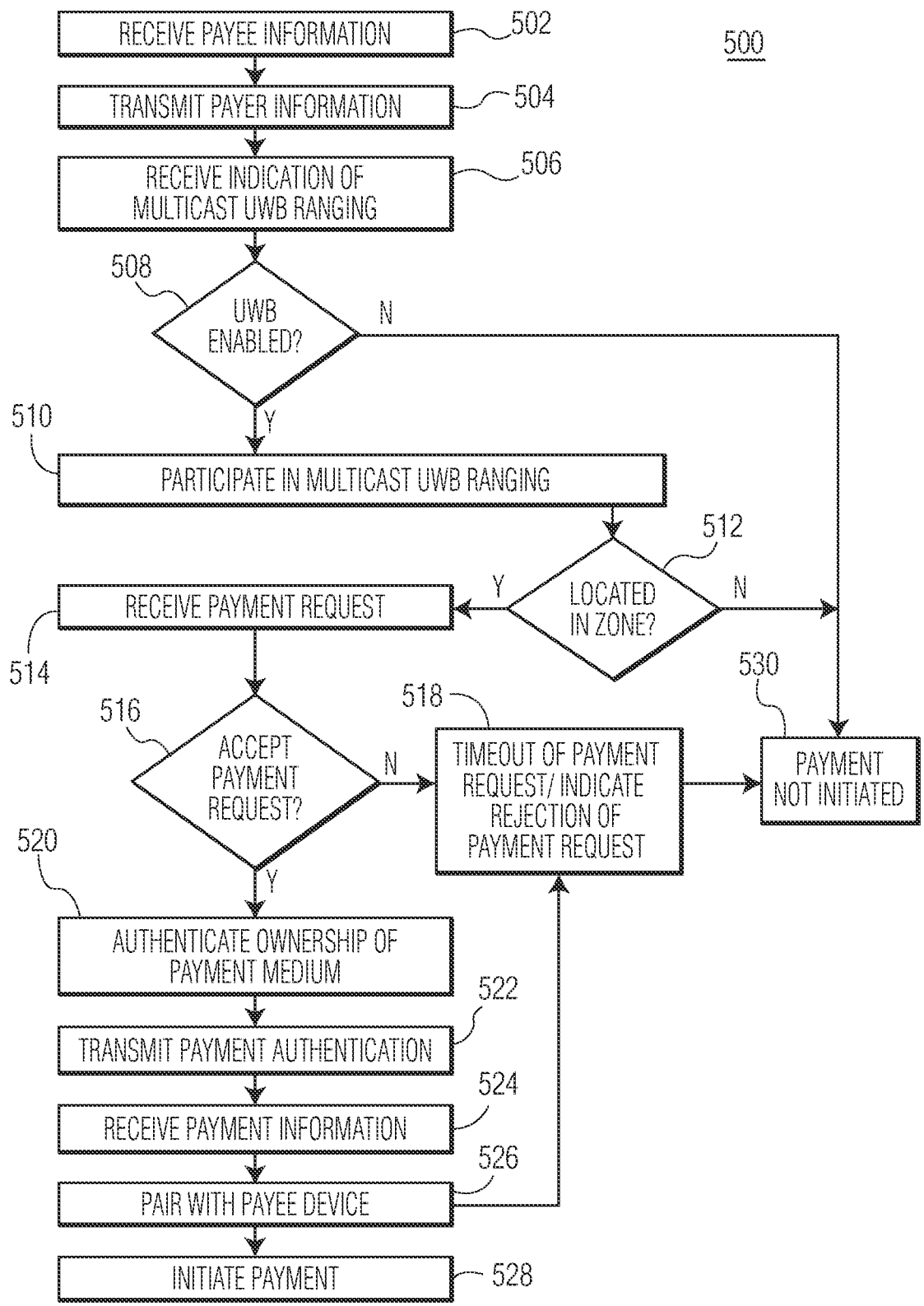
FIG. 5 is a process flow diagram of payer operations during a wireless transaction.

FIG. 5 is a process flow diagram of payer operations 500 during a wireless transaction. In an embodiment, the payer operations 500 may be implemented by a payer device (not shown) when communicating with a payee device (not shown) as described with reference to FIG. 3.

At block 502, the payer device receives payee information from the payee device as part of an initiated wireless transaction. The payer device then transmits payer information to the payee device at block 504. At block 506, the payer device receives an indication that multicast UWB ranging has been initiated by the payee device.

At block 508, the payer device determines how to proceed depending on whether the payer device is UWB enabled. If the payer device is not UWB enabled (shown by "N"), then at block 530, the payer device does not initiate a payment. If the payer device is UWB enabled (shown by "Y"), then at block 510, the payer device begins participating in the multicast UWB ranging with the payee device.

After participating in the multicast UWB ranging, the payer device may determine whether the payer device is located in a payment zone defined by the payee device at block 512. If the payer device is not located in the payment zone (shown by "N"), then at block 530 the payer device does not initiate a payment. Alternatively, if the payer device is located in the payment zone (shown by "Y"), then at block 514 the payer device receives a payment request from the payee device.

Once the payer device receives the payment request, the payer device determines whether to accept the payment request at block 516. In one embodiment, if the payer device does not act upon the payment request (shown by "N"), then at block 518, a timeout of the payment request occurs, and the payer device does not initiate a payment at block 530. In another embodiment, if the payer device rejects the payment request (shown by "N"), then at block 518, the payer device indicates rejection of the payment request to the payee device and does not initiate a payment at block 530. In yet another embodiment, if the payer device accepts the payment request (shown by "Y"), then the payer device authenticates ownership of a payment medium at block 520.

After the payer device authenticates ownership of the payment medium, the payer device transmits a payment authentication to the payee device at block 522. At block 524, the payer device then receives payment information from the payee device and pairs with the payee device at block 526. In one embodiment, after the payer device pairs with the payee device, a timeout of the payment request may occur at block 518, such that a payment is not initiated at block 530. In another embodiment, after the payer device pairs with the payee device, the payer device initiates a payment at block 528.

Although FIG. 5 depicts payer device operations with reference to a wireless financial transaction, similar operations may also be used for wireless non-financial transactions and other wireless transactions. Such operations may involve a second device performing similar steps during the wireless transaction being conducted. In an embodiment, the second device communicates with a first device and operates according to information exchanged during the wireless transaction.

In an embodiment, for a wireless transaction system to initiate a payment, a distance between a payer device and a payee device, and an AoA of the payer device may need to be confirmed to determine whether the payer device can initiate a payment and pair with the payee device. In such an embodiment, confirming the distance and the AoA may include determining whether the distance is within a predefined distance range and the AoA is within a predefined AoA range. Example outcomes of a wireless transaction where a distance is determined whether to be within a predefined distance range are described in further detail with reference to FIGS. 6A-6B. Additionally, example outcomes of a wireless transaction where an AoA is determined whether to be within a predefined AoA range are described in further detail with reference to FIGS. 7A-7B.

Figure 6A:
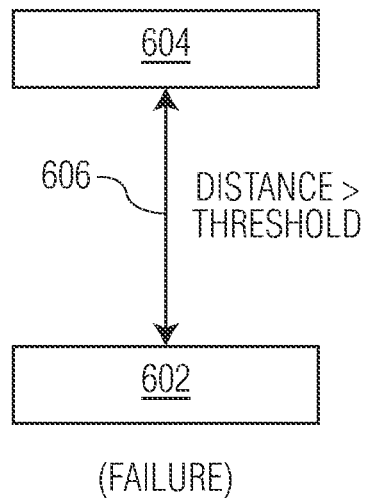
FIG. 6A illustrates an example of a failed wireless transaction.

FIG. 6A illustrates an example of a failed wireless transaction. In the embodiment of FIG. 6A, a payer device 602 has a distance 606 and has communicated with a payee device 604 in attempt to initiate a payment as described with reference to FIG. 3, FIG. 4, and FIG. 5.

The distance 606 is determined by the distance between the payee device 604 and the payer device 602. However, when confirming, using the distance, whether the distance 606 is within a predefined distance range, the payee device and/or the payer device determines that the distance 606 is not within the predefined distance range. As such, the payee device 604 and the payer device 602 are unable to pair, and the payment is not initiated.

Figure 6B:
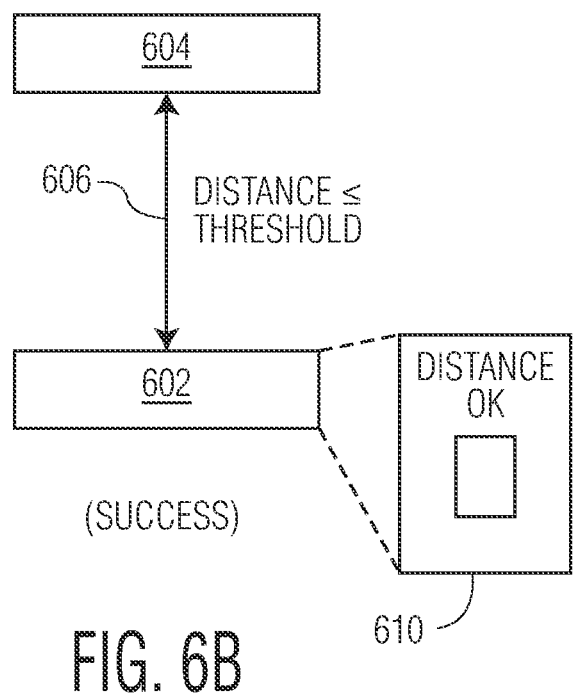
FIG. 6B illustrates an example of a successful wireless transaction.

FIG. 6B illustrates an example of a successful wireless transaction. In the embodiment of FIG. 6B, the payer device 602 has a distance 606 as described with reference to FIG. 6A, and has communicated with the payee device 604 in attempt to initiate a payment as described with reference to FIG. 3, FIG. 4, and FIG. 5.

In the embodiment of FIG. 6B, the payee device and/or the payer device determines that the distance 606 is within the predefined distance range. As such, an indication that the distance 606 is OK is visualized to a user of the payer device 602 (shown by "Distance OK" in frame 610). The indication may be visualized, for example, via a GUI or a UI of the payer device 602. After the distance is determined to be within the predefined distance range, the payee device 604 and the payer device 602 are able to pair and initiate the payment.

Figure 7A:
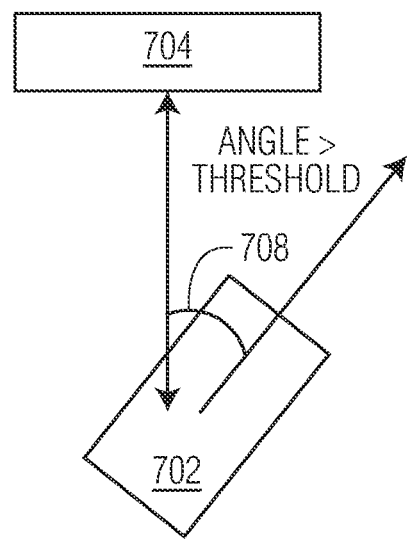
FIG. 7A illustrates another example of a failed wireless transaction.

FIG. 7A illustrates another example of a failed wireless transaction. In the embodiment of FIG. 7A, a payer device 702 has an AoA 708 and has communicated with a payee device 704 in attempt to initiate a payment as described with reference to FIG. 3, FIG. 4, and FIG. 5.

The AoA 708 is determined by the orientation of the payer device 702 in relation to the payee device 704 (shown by arrows extending into and from the payer device 702). However, when confirming, using the AoA, whether the AoA 708 is within a predefined AoA range, the payer device determines that the AoA 708 is not within the predefined AoA range. As such, the payee device 704 and the payer device 702 are unable to pair, and the payment is not initiated.

Figure 7B:
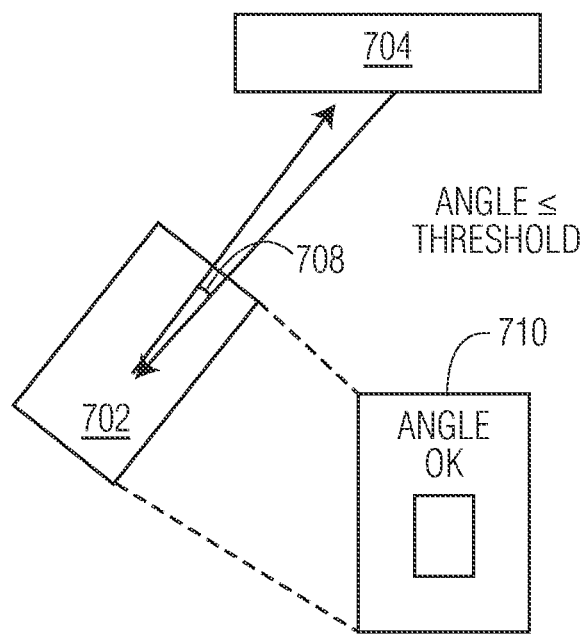
FIG. 7B illustrates another example of a successful wireless transaction.

FIG. 7B illustrates another example of a successful wireless transaction. In the embodiment of FIG. 7B, the payer device 702 has an AoA 708 as described with reference to FIG. 7A, and has communicated with the payee device 704 in attempt to initiate a payment as described with reference to FIG. 3, FIG. 4, and FIG. 5.

In the embodiment of FIG. 7B, the payer device determines that the AoA 708 is within the predefined AoA range. As such, an indication that the AoA 708 is OK is visualized to a user of the payer device 702 (shown by "Angle OK" in frame 710). The indication may be visualized, for example, via a GUI or a UI of the payer device 702. After the AoA is determined to be within the predefined AoA range, the payee device 704 and the payer device 702 are able to pair and initiate the payment.

In an embodiment, for a wireless transaction system to initiate a payment, a user of a payer device may need to trigger initiation of the payment. In such an embodiment, triggering the initiation of the payment may include visualizing to the user, payment information and UWB-based measurements, so that the user can confirm the details of the wireless transaction. An example of a wireless transaction where a user triggers initiation of a payment is described in further detail with reference to FIG. 8.

Figure 8:
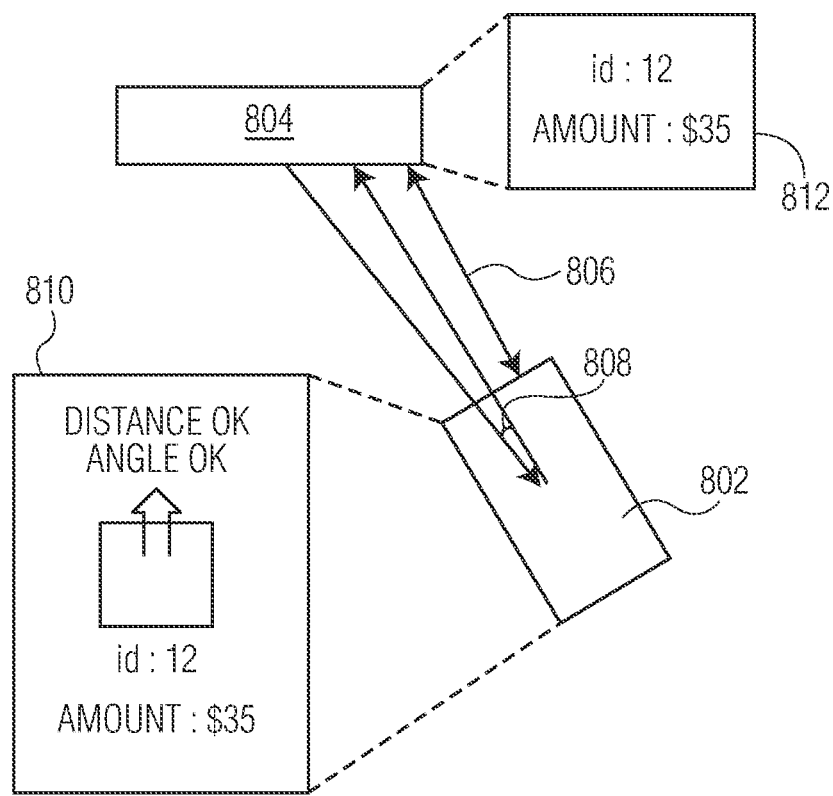
FIG. 8 illustrates an example of a wireless transaction between a payer device and a payee device.

FIG. 8 illustrates an example of a wireless transaction between a payer device 802 and a payee device 804. In the embodiment of FIG. 8, the payer device 802 has a distance 806 as described with reference to FIG. 6B, an AoA 808 as described with reference to FIG. 7B, and has communicated with the payee device 804 to initiate a payment as described with reference to FIG. 3, FIG. 4, and FIG. 5.

The wireless transaction includes confirming, using the distance and the AoA, that the distance 806 is within the predefined distance range and that the AoA 808 is within the predefined AoA range. Because the distance 806 is within the predefined distance range and the AoA 808 is within the predefined AoA range, the payee device 804 and the payer device 802 are able to pair and visualize that the distance 806 and the AoA 808 are OK to a user of the payer device 802 (shown by "Distance OK" and "Angle OK" in frame 810).

In addition, payment information is visualized to the user of the payer device 802 (shown by "id: 12" and "amount: $35" in frame 810) and to a user of the payee device 804 (shown by "id: 12" and "amount: $35" in frame 812). Once the payment information is confirmed by the user of each device, the user of the payer device 802 is able to trigger initiation of the payment. In an embodiment, the user of the payer device 802 triggers initiation of the payment by swiping up on a notification (shown by arrow extending up from box in frame 810). Although the initiation of the payment is described as being triggered by swiping up on a notification, triggering initiation of the payment is not limited "swiping".

Figure 9:
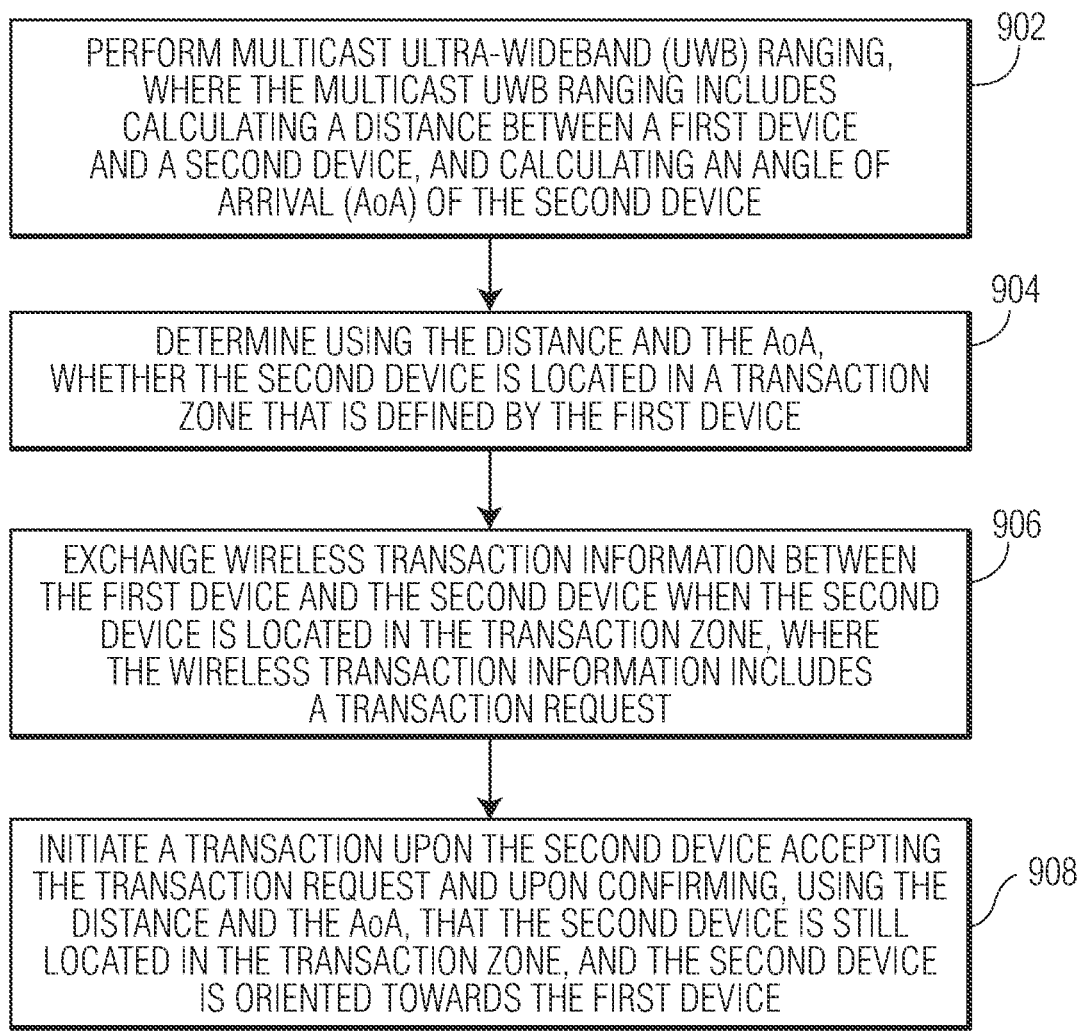
FIG. 9 is a flow diagram of a technique for wireless transactions in accordance with an embodiment of the invention.

FIG. 9 is a flow diagram of a technique for wireless transactions in accordance with an embodiment of the invention. At block 902, multicast UWB ranging is performed, where the multicast UWB ranging includes calculating a distance between a first device and a second device, and calculating an AoA of the second device. At block 904, the distance and the AoA is used to determine whether the second device is located in a transaction zone that is defined by the first device. At block 906, wireless transaction information is exchanged between the first device and the second device when the second device is located in the transaction zone, where the wireless transaction information includes a transaction request. At block 908, a transaction is initiated upon the second device accepting the transaction request and upon confirming, using the distance and the AoA, that the second device is still located in the transaction zone, and the second device is oriented towards the first device.

Figure 10:
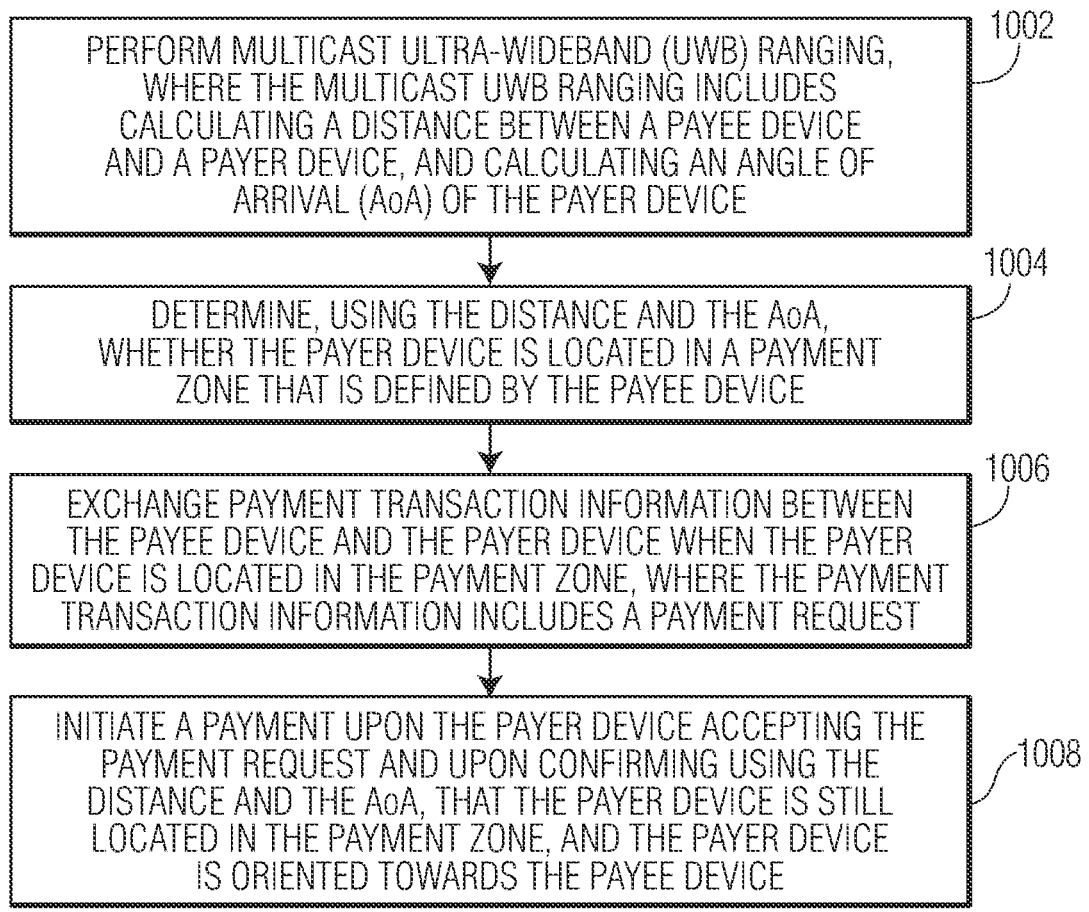
FIG. 10 is a flow diagram of a technique for wireless financial transactions in accordance with an embodiment of the invention.

FIG. 10 is a flow diagram of a technique for wireless financial transactions in accordance with an embodiment of the invention. At block 1002, multicast UWB ranging is performed, where the multicast UWB ranging includes calculating a distance between a payee device and a payer device, and calculating an AoA of the payer device. At block 1004, the distance and the AoA is used to determine whether the payer device is located in a payment zone that is defined by the payee device. At block 1006, payment transaction information is exchanged between the payee device and the payer device when the payer device is located in the payment zone, where the payment transaction information includes a payment request. At block 1008, a payment is initiated upon the payer device accepting the payment request and upon confirming, using the distance and the AoA, that the payer device is still located in the payment zone, and the payer device is oriented towards the payee device.

In some embodiments, the technique for wireless transactions may be implemented by a wireless transactions system. For example, a wireless transaction system may include a first device configured to perform multicast UWB ranging, where the multicast UWB ranging includes calculating a distance between the first device and a second device, and calculating an AoA of the second device, determine, using the distance and the AoA, whether the second device is located in a transaction zone defined by the first device, and exchange wireless transaction information with the second device when the second device is located in the transaction zone, where the wireless transaction information includes a transaction request. In such an example, the wireless transaction system may also include a second device configured to initiate a transaction upon accepting the transaction request and upon confirming, using the distance and the AoA, that the second device is still located in the transaction zone, and the second device is oriented towards the first device.

Figure 11:
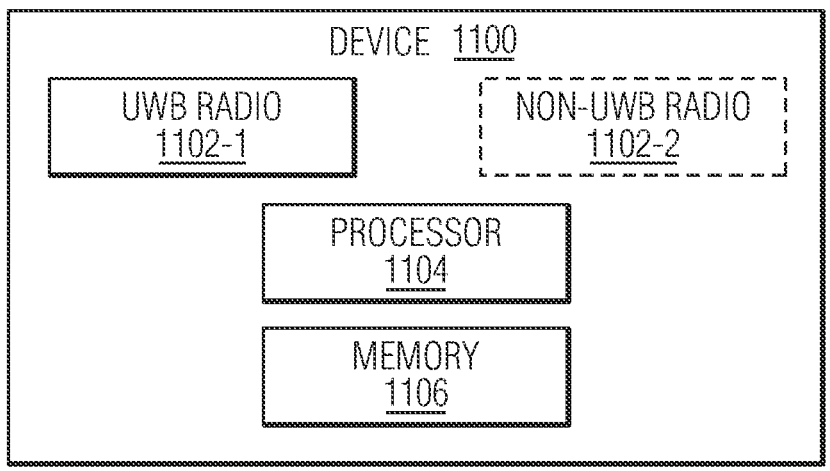
FIG. 11 depicts an example of a device that can implement a technique for wireless transactions.

In an embodiment, the above-described functionality is performed at least in part by a device (e.g., computer or computers), which executes computer readable instructions. FIG. 11 depicts an example of a device 1100 that can implement the technique for wireless transactions as described with reference to FIG. 9 and FIG. 10. As shown, the device 1100 includes a UWB radio 1102-1, a processor 1104, a memory 1106, and optionally (shown by dashed box), a non-UWB radio 1102-2.

The processor may include a multifunction processor and/or an application-specific processor. The memory within the device may include, for example, a storage medium such as read only memory (ROM), flash memory, random-access memory (RAM), and a large capacity permanent storage device such as a hard disk drive. The UWB radio and the non-UWB radio enable communications with other devices. For example, the UWB radio may include a UWB RF front-end antenna, such that the UWB radio may communicate with devices (e.g., payee devices, payer devices, first devices, or second devices) using a UWB wireless protocol. As another example, the non-UWB radio may include a non-UWB RF front-end antenna, such that the non-UWB radio may communicate with devices using a non-UWB wireless protocol. The device executes computer readable instructions stored in the storage medium to implement various tasks as described above. Furthermore, the device 1100 can include a computing system (not shown) that features multiple components that may be used for wireless financial transaction services.

The device 1100 may represent, e.g., the payee devices (e.g., a first device) or the payer devices (e.g., a second device) as described with reference to FIGS. 1-8. In some embodiments, the device 1100 may be integrated with consumer electronic devices (e.g., mobile phones, laptops, smartwatches, wearable tags, etc.) and/or with industrial electronic devices (e.g., cash registers, vending machines, etc.). For example, the device may be embedded into mobile phones or cash registers to assist with wireless financial transaction services.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, an RAM, an ROM, a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:
1. A method comprising:
performing multicast Ultra-Wideband (UWB) ranging, wherein the multicast UWB ranging includes:
calculating a distance between a first device and a second device; and
calculating an angle of arrival (AoA) of the second device;
determining, using the distance and the AoA, whether the second device is located in a transaction zone that is defined by a distance, a magnitude of angle, and an orientation with respect to the first device, wherein the distance, magnitude of angle, and direction are predefined and are selected from a list of predefined distance, magnitude of angle, and direction for specific uses, and wherein the specific uses include at least one selected from the group consisting of an hour of day, a number of second devices present, and type of wireless financial transaction being performed;
exchanging wireless transaction information between the first device and the second device when the second device is located in the transaction zone, wherein the wireless transaction information includes a transaction request; and
initiating a transaction upon the second device accepting the transaction request and upon confirming, using the distance and the AoA, that:

the second device is still located in the transaction zone; and
the second device is oriented towards the first device.

2. The method of claim 1, wherein confirming the distance and the AoA includes determining whether:
the distance is within a predefined distance range; and
the AoA is within a predefined AoA range.

3. The method of claim 1, wherein;
at least one of the second device and the first device calculates the distance; and
the first device calculates the AoA.

4. The method of claim 1, wherein the multicast UWB ranging is performed by the first device and devices included in a multicast responders list; and
wherein the devices included in the multicast responders list include the second device and other devices that exchanged first device information and second device information with the first device prior to the multicast UWB ranging.

5. The method of claim 4, wherein exchanging the first device information and the second device information includes:
transmitting, by the first device to the second device, the first device information;
receiving, by the second device from the first device, the first device information;
transmitting, by the second device to the first device, the second device information in response to receiving the first device information;
receiving, by the first device from the second device, the second device information; and
creating, by the first device, the multicast responders list that includes the second device in response to receiving the second device information.

6. The method of claim 1, wherein the transaction zone defined by the first device is within a predefined calculated range of a UWB radio of the first device.

7. The method of claim 1, wherein determining whether the second device is located in the transaction zone includes:
the second device being included in a multicast responders list; and
removing the second device from the multicast responders list when the second device is not located in the transaction zone.

8. The method of claim 1, wherein exchanging the wireless transaction information includes:
transmitting, by the first device to the second device, the transaction request, wherein the second device is included in a reduced multicast responders list;
receiving, by the second device from the first device, the transaction request; and
determining, by the second device, whether to accept the transaction request.

9. The method of claim 8, wherein determining whether to accept the transaction request involves a timeout of the transaction request when the second device does not act upon the transaction request within a defined amount of time.

10. The method of claim 8, wherein determining whether to accept the transaction request involves the transaction request being discarded from other devices when the second device accepts the transaction request.

11. The method of claim 1, wherein exchanging the wireless transaction information includes:

authenticating ownership of a transaction medium when the second device accepts the transaction request, and wherein authenticating ownership of the transaction medium includes:
an application prompting authentication to a user of the second device, wherein the user performs the authentication; and
receiving, by the second device from the first device, transaction information in response to the user completing the authentication.

12. The method of claim 1, wherein the wireless transaction information includes partial information for privacy of the wireless transaction information.

13. The method of claim 1, wherein the second device and the first device pair before the transaction is initiated.

14. The method of claim 13, wherein the second device and the first device receive a confirmation notification once the second device and the first device are paired.

15. The method of claim 1, wherein initiating the transaction involves triggering, by a user of the second device, initiation of the transaction.

16. The method of claim 15, wherein the user of the second device triggers initiation of the transaction by swiping a transaction medium towards the first device.

17. The method of claim 16, wherein the transaction medium is shown by the second device via at least one of a graphical user interface (GUI) and a user interface (UI).

18. The method of claim 1, wherein the second device provides a visual confirmation that the second device is oriented towards the first device before the transaction is initiated.

19. A system comprising:
a first device configured to:
perform multicast Ultra-Wideband (UWB) ranging, wherein the multicast UWB ranging includes:
calculating a distance between the first device and a second device; and
calculating an angle of arrival (AoA) of the second device;
determine, using the distance and the AoA, whether the second device is located in a transaction zone defined by a distance, a magnitude of angle, and an orientation with respect to the first device, wherein the distance, magnitude of angle, and direction are predefined and are selected from a list of predefined distance, magnitude of angle, and direction for specific uses, and wherein the specific uses include at least one selected from the group consisting of an hour of day, a number of second devices present, and type of wireless financial transaction being performed; and
exchange wireless transaction information with the second device when the second device is located in the transaction zone, wherein the wireless transaction information includes a transaction request; and
the second device configured to:
initiate a transaction upon accepting the transaction request and upon confirming, using the distance and the AoA, that:
the second device is still located in the transaction zone; and
the second device is oriented towards the first device.

20. A method comprising:
performing multicast Ultra-Wideband (UWB) ranging, wherein the multicast UWB ranging includes:
calculating a distance between a payee device and a payer device; and calculating an angle of arrival (AoA) of the payer device;

determining, using the distance and the AoA, whether the payer device is located in a payment zone that is defined by a distance, a magnitude of angle, and an orientation with respect to the payee device, wherein the distance, magnitude of angle, and direction are pre-defined and are selected from a list of predefined distance, magnitude of angle, and direction for specific uses, and wherein the specific uses include at least one selected from the group consisting of an hour of day, a number of second devices present, and type of wireless financial transaction being performed;

exchanging payment transaction information between the payee device and the payer device when the payer device is located in the payment zone, wherein the payment transaction information includes a payment request; and initiating a payment upon the payer device accepting the payment request and upon confirming, using the distance and the AoA, that:
  the payer device is still located in the payment zone; and
  the payer device is oriented towards the payee device.

* * * * *